United States Patent
Anders et al.

(10) Patent No.: US 11,093,858 B2
(45) Date of Patent: *Aug. 17, 2021

(54) TRAINING A COGNITIVE SYSTEM ON PARTIAL CORRECTNESS

(71) Applicant: International Business Machines Corporation, Armonk, NY (US)

(72) Inventors: Kelley L. Anders, East New Market, MD (US); Paul K. Bullis, Cedar Park, TX (US); Geoffrey M. Hambrick, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 926 days.

This patent is subject to a terminal disclaimer.

(21) Appl. No.: 15/797,608

(22) Filed: Oct. 30, 2017

(65) Prior Publication Data
US 2019/0130307 A1    May 2, 2019

(51) Int. Cl.
*G06N 20/00* (2019.01)
*G06N 5/04* (2006.01)
*G06F 40/30* (2020.01)
*G06F 40/205* (2020.01)

(52) U.S. Cl.
CPC .......... *G06N 20/00* (2019.01); *G06F 40/205* (2020.01); *G06F 40/30* (2020.01); *G06N 5/048* (2013.01)

(58) Field of Classification Search
CPC ...................................................... G06N 5/048
See application file for complete search history.

(56) References Cited

U.S. PATENT DOCUMENTS

| | | | | |
|---|---|---|---|---|
| 6,101,515 A | * | 8/2000 | Wical | G06F 16/353 715/234 |
| 6,360,227 B1 | * | 3/2002 | Aggarwal | G06F 16/954 |
| 6,571,240 B1 | | 5/2003 | Ho et al. | |
| 10,445,569 B1 | * | 10/2019 | Lin | G06F 40/279 |
| 2004/0083191 A1 | | 4/2004 | Ronnewinkel et al. | |
| 2004/0090472 A1 | * | 5/2004 | Risch | G06F 16/9038 715/853 |

(Continued)

OTHER PUBLICATIONS

Li et al. (Learning Question Classifiers, Aug. 2002, pp. 1-7) (Year: 2002).*

(Continued)

*Primary Examiner* — George Giroux
(74) *Attorney, Agent, or Firm* — Garg Law Firm, PLLC; Rakesh Garg; Alexander Jochym

(57) ABSTRACT

A set of components is computed from performing NLP on a question in an input. An actual answer is computed corresponding to the question by a cognitive system. the actual answer corresponds to an actual subset of the set of components, and an expected answer corresponds to an expected subset of the subset of components. The actual answer is mapped to an actual category in a hierarchy of answer categories. A distance between the expected answer and the actual answer is computed where the distance is a function of a path in the hierarchy from the actual category to the expected category, and a degree of correctness of the actual answer is another function of the distance. A self-learning operation in the cognitive system causes a revised actual answer on the question being at a shorter distance from the expected answer.

16 Claims, 9 Drawing Sheets

(56) References Cited

U.S. PATENT DOCUMENTS

| | | |
|---|---|---|
| 2005/0266387 A1 | 12/2005 | Rossides |
| 2012/0254251 A1* | 10/2012 | Barbosa .............. G06F 16/8373 707/797 |
| 2015/0261859 A1 | 9/2015 | Isensee et al. |
| 2016/0179945 A1* | 6/2016 | Lastra Diaz ........ G06F 16/3334 707/739 |
| 2016/0232221 A1 | 8/2016 | McCloskey et al. |
| 2017/0161271 A1* | 6/2017 | Barel ................. G06F 16/2246 |
| 2017/0200077 A1* | 7/2017 | Weston ................ G06F 40/279 |

OTHER PUBLICATIONS

Harabagiu et al. (FALCON: Boosting Knowledge for Answer Engines, Nov. 2000, pp. 1-10) (Year: 2000).*

Y. Even-Zohar and D. Roth, "A sequential model for multi class classification," in EMNLP-2001, the SIGDAT Conference on Empirical Methods in Natural Language Processing, pp. 10-19. Retrieved from Internet using: https://arxiv.org/pdf/cs/0106044.pdf.

U. Hermjakob, "Parsing and question classification for question answering," Proceedings of the workshop on Open-domain question answering—vol. 12. Association for Computational Linguistics, 2001. Retrieved from Internet using: http://acl-arc.comp.nus.edu.sg/archives/acl-arc-090501d4/data/pdf/anthology-PDF/W/W01/W01-1203.pdf.

X. Li, and Dan Roth. "Learning question classifiers," Proceedings of the 19th international conference on Computational linguistics—vol. 1. Association for Computational Linguistics, 2002. Retrieved from Internet using: http://ucrel.lancs.ac.uk/acl/C/C02/C02-1150.pdf.

IBM, "Centralized mechanism for project team development artifacts for purpose to reuse for system deployment, configuration, reporting and management," Nov. 27, 2007.

"A system or method to notify related artifact changes by maintaining artifact relationships" Aug. 8, 2011.

U.S. Appl. No. 15/191,127, filed Jun. 23, 2016.

Appendix P, 2017.

* cited by examiner

*FIGURE 5*

| STATE 502 | EXPECTED 504 | ACTUAL 506 | DESCRIPTION 508 | ALGORITHMIC NOTATION 510 | RESULTS AS COMPUTED 512 |
|---|---|---|---|---|---|
| TOO SHALLOW STATE | CATEGORY I.A.1 | CATEGORY I.A | EXPECTED CATEGORY COMPONENTS ARE A SUPERSET OF THE ACTUAL CATEGORY COMPONENTS RETURNED | % CORRECT = NUMBER RETURNED / NUMBER EXPECTED % INCORRECT = 0% | 66% 0% |
| EXACT MATCH STATE | CATEGORY I.A.2 | CATEGORY I.A.2 | ALL EXPECTED CATEGORY COMPONENTS EXACTLY MATCH THE ACTUAL CATEGORY COMPONENTS RETURNED FROM THE TEST, NO MORE, NO LESS | % CORRECT = 100% % INCORRECT = 0% | 100% 0% |
| TOO DEEP STATE | CATEGORY I.B | CATEGORY I.B.1 | EXPECTED CATEGORY COMPONENTS ARE A SUBSET OF THE ACTUAL CATEGORY COMPONENTS RETURNED | % CORRECT = 100% % INCORRECT = NUMBER EXPECTED / NUMBER RETURNED - 1 | 100% 33% |
| OFF TRACK STATE | CATEGORY I.A.2 | CATEGORY I.A.1 | EXPECTED CATEGORY COMPONENTS ARE AN OVERLAPPING SET OF THE ACTUAL CATEGORY COMPONENTS RETURNED | %CORRECT = NUMBER OVERLAP / NUMBER EXPECTED % INCORRECT = NUMBER NOT OVERLAPPING / NUMBER EXPECTED | 66% 33% |
| NO MATCH STATE | CATEGORY I.A.1 | CATEGORY II | EXPECTED CATEGORY COMPONENTS ARE A TOTALLY DISJOINT SET OF THE ACTUAL CATEGORY COMPONENTS RETURNED | %CORRECT = 0% %INCORRECT = 100.0% | 0% 100% |

500

514 — TOO SHALLOW STATE
516 — EXACT MATCH STATE
518 — TOO DEEP STATE
520 — OFF TRACK STATE
522 — NO MATCH STATE

*FIGURE 6*

| STATE 602 | LEARNING OPERATIONS 604 |
|---|---|
| 606 TOO SHALLOW STATE | LOOK AT THE QUESTION TEXT FOR KEYWORDS IN THE QUESTION THAT ARE SYNONYMS FOR THE EXPECTED CATEGORIES TO INCREASE THE NUMBER OF CATEGORY COMPONENTS RETURNED |
| 608 EXACT MATCH STATE | NO RECOMMENDED ACTIONS TO IMPROVE THE CATEGORIZATION TREE, OR (OPTIONALLY) REINFORCE FOR INCREASED LIKELIHOOD OF SIMILAR PERFORMANCE NEXT TIME |
| 610 TOO DEEP STATE | EXAMINE THE EXTRA COMPONENTS WITH RESPECT TO THE QUESTION TEXT TO SEE IF THE HIERARCHICAL CATEGORY NEEDS TO BE EXTENDED AND/OR IMPROVE THE CA TO AVOID RETURNING THAT CATEGORY COMPONENT |
| 612 OFF TRACK STATE | EXAMINE THE INCORRECT COMPONENTS AND THE QUESTION TEXT FOR ONE OR MORE KEYWORDS THAT REPRESENT A NEW BRANCH WITH A COMMON ANCESTOR IN THE CATEGORIZATION TREE AND/OR IMPROVE THE CA TO AVOID RETURNING THAT CATEGORY COMPONENT |
| 614 NO MATCH STATE | EXAMINE THE INCORRECT COMPONENTS AND THE QUESTION TEXT FOR ONE OR MORE KEYWORDS THAT ARE SYNONYMS FOR A COMMON ANCESTOR PATH IN THE CATEGORIZATION TREE AND/OR IMPROVE THE CA TO AVOID RETURNING THAT CATEGORY COMPONENT |

600

100,000,000

TRAINING A COGNITIVE SYSTEM ON PARTIAL CORRECTNESS

TECHNICAL FIELD

The present invention relates generally to a system, and computer program product for training cognitive systems. More particularly, the present invention relates to a system, and computer program product for training a cognitive system based on partial correctness of its responses to inputs.

BACKGROUND

A cognitive system (also known as a "question and answer system" or a "Q and A system") is an artificial intelligence application executing on data processing hardware. Cognitive systems are in a category of technologies that uses natural language processing and machine learning to enable people and machines to interact more naturally to extend and magnify human expertise and cognition. These systems learn from an available body of knowledge (knowledgebase) and answer questions and queries pertaining to the subject-matter domain of the knowledgebase by analyzing the relationships and significant aspects that are expressed in or inferable from the knowledgebase. For example, a knowledgebase of a domain can include structured repositories of domain-specific information, such as ontologies, taxonomies, or unstructured data related to the domain, or a collection of natural language documents about the domain.

A cognitive system can also use deep learning and other cognitive techniques to perform sentiment analysis on a given information input. For example, the sentiment analysis can analyze and extract a linguistic tone of the information input, a like or dislike and a degree thereof expressed in the information input, a main subject or a topic being discussed or described in the information input, and many other language-based features of the information input. The information input is human-usable natural language input, such as a natural language text, audio of a human speech, a video or an image of human facial expressions or other bodily gestures, and the like.

A method of determining the accuracy of a cognitive system includes verifying an answer provided by the cognitive system using a set of acceptable answers. The set of acceptable answers is called an answer key. If the cognitive system's answer for a question matches an answer for that question in the answer key, the cognitive system is deemed to have responded correctly, otherwise incorrectly. The proportionality of the correct versus the incorrect answers for a battery of questions in a given domain corresponds to the accuracy of the cognitive system in that domain.

A cognitive system is trained in a similar manner—by subjecting the cognitive system to an input question, comparing an actual answer of the cognitive system with an expected answer, and adjusting one or more aspects of the training to cause the trained cognitive system to output the expected answer corresponding to the input. The adjustments include a manner in which the input is analyzed, the manner in which a knowledgebase is analyzed to find a matching answer, or both.

SUMMARY

The illustrative embodiments provide a system, and computer program product. An embodiment derives the degree of correctness of an answer, and thereby determines how to modify or manipulate the category hierarchy. The embodiment computes, by performing Natural Language Processing (NLP), a set of components from a question in an input. The embodiment computing, by operating a cognitive system using a processor and a memory, an actual answer corresponding to the question, wherein the actual answer corresponds to an actual subset of the set of components, and wherein an expected answer corresponds to an expected subset of the subset of components. The embodiment maps the actual answer to an actual category in a hierarchy of answer categories. The embodiment computes a distance between the expected answer and the actual answer, the expected answer corresponding to the question, wherein the distance is a function of a path in the hierarchy from the actual category to the expected category, and wherein a degree of correctness of the actual answer is another function of the distance. The embodiment causes a self-learning operation in the cognitive system to form a modified cognitive system, wherein a revised actual answer computed using the modified cognitive system on the question results in a second distance from the expected answer, the second distance being less than the original distance that caused the learning.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts an example operation for training a cognitive system on partial correctness in accordance with an illustrative embodiment;

FIG. 6 depicts a table of some example learning operations performable for training a cognitive system on partial correctness in accordance with an illustrative embodiment;

DETAILED DESCRIPTION

Figure 1:
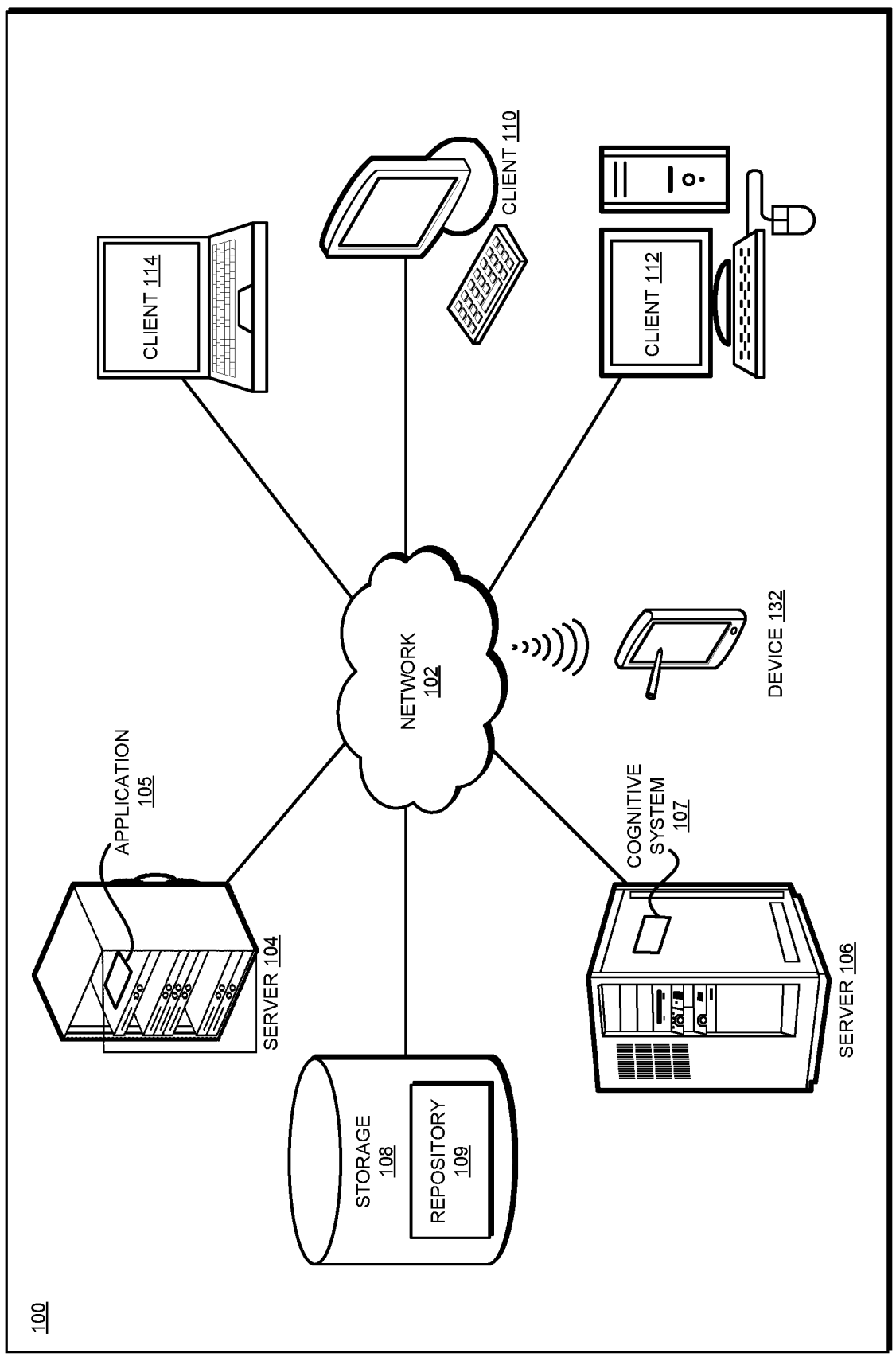
FIG. 1 depicts a block diagram of a network of data processing systems in which illustrative embodiments may be implemented.

The illustrative embodiments recognize that presently, a cognitive system's answers are evaluated in a binary fashion—the answer is either right or wrong. When a cognitive system is deployed for answering questions, the outputs of the cognitive system are deemed to be either correct or incorrect—e.g., whether the cognitive system helped resolve the question. The training methodology for training cognitive systems also similarly concludes that the cognitive system is ready for deployment when a threshold percentage of answers provided by the cognitive system are correctly matching the corresponding expected answers.

The illustrative embodiments recognize that this "all or nothing" analysis of cognitive system performance is an improper indication of cognitive system's value in a given field of deployment. The illustrative embodiments recognize that many questions pertain to problem solving processes that involve many steps and follow an interview type approach. While an actual answer provided by a cognitive system may not be exactly the expected answer, the actual answer may be partially correct, and based on this answer further questions or interview can be tailored to draw the actual answer closer to the expected answer.

Furthermore, the illustrative embodiments recognize that determining the partial correctness of an actual answer can also have cost implications. For example, an actual answer may be reached by expending x amount of resources and an expected answer may be reachable from the actual answer by an incremental expense of y additional resources. Presently, if an actual answer is incorrect, the expenditure of x resources is entirely discounted by the binary manner of answer correctness analysis—i.e., it is presumed that spending the x amount was a waste because the cognitive system failed to compute the expected answer. Thus, it is typical that the cognitive component is undervalued in the end-to-end system.

The illustrative embodiments recognize that the determination of whether an actual answer is correct to any degree, incorrect to any degree, or both, is a difficult problem to solve. Presently, manual efforts have to be expended during training to determine whether a cognitive system in-training is ready to be used "in production" with live users. A human expert determines the closeness of an actual answer to an expected answer and makes a human-determined adjustment to improve the closeness. Once deployed, or even in training, the cognitive system itself has no mechanism by which the cognitive system can recognize the partial correctness of an actual answer, reassess the input and the available knowledge, and make an adjustment within the cognitive system to cause the degree of correctness to increase for that input.

The illustrative embodiments recognize that the presently available tools or solutions do not address these needs/problems or provide adequate solutions for these needs/problems. The illustrative embodiments used to describe the invention generally address and solve the above-described problems and other related problems by training a cognitive system on partial correctness.

An embodiment can be implemented as a software application. The application implementing an embodiment, or one or more components thereof, can be configured as a modification of an existing cognitive system training platform—i.e., a native application in the cognitive system training platform, as an application executing in a data processing system communicating with an existing cognitive system training platform over a short-range radio network such as Bluetooth, over a wired or wireline local area network (LAN)—i.e., a local application on the LAN, as an application executing in a data processing system communicating with an existing cognitive system training platform over a wide area network (WAN)—i.e., a remote application on the WAN, as a separate application that operates in conjunction with an existing telecommunications system in other ways, a standalone application, or some combination thereof.

Within the scope of the illustrative embodiments, an input to a cognitive system is a question, for which the cognitive system produces an output. The output is the cognitive system's actual answer for the question in the input. The actual answer can be a reference to a resource. For example, when the input is a trouble description in a trouble ticket meant for technical support staff, an answer can be documentation of steps that if followed will resolve the trouble, an identification of a person, group, or workflow that can assist with the trouble, or some combination thereof.

An embodiment provides an improved training method for a cognitive system that allows it to be used in production far more quickly and adapt over time. As a part of the improved training, the embodiment analyzes an input, e.g., by parsing the natural language input using known Natural Language Processing (NLP) techniques. The embodiment produces a set of lexical components, or tokens, from the input. A component in the set of components may or may not be expressly present or specified in the input. A component can be derived or deduced from the information provided in the input. A component can be a portion of the information provided in the input. The information provided in the input can be provided or expressed in any suitable natural language.

A knowledgebase is available to the cognitive system. An embodiment assigns a category to an answer or manner of computing the answer, where the answer is computable from using a knowledge item available in the knowledge base. In this manner, the embodiment organizes the answers possible from the participation of the knowledge items into a set of categories. The embodiment organizes the set of categories into one or more tree-like hierarchies of categories. The root category of a hierarchy is the broadest category that is reachable by using the least number of input components. Categories that are increasingly deeper in the hierarchy include answers that correspondingly increase in specificity. Accordingly, reaching a category deeper in the hierarchy (farther from the root category) requires a correspondingly more specific input, i.e., more components, components of greater specificity, or some combination thereof, as compared to reaching a shallower category in the hierarchy (comparatively closer to the root category).

An embodiment selects all or a subset of components of the supplied input to select a category of answers. The category can be anywhere in the hierarchy of categories. The selection of the category is indicative of the cognitive system selecting an answer from that category in response to the input question. In other words, a selected category is a part of an actual answer (hereinafter referred to as an actual category). Similarly, a category of an expected answer is also a part of the expected answer (hereinafter referred to as an expected category). The expected answer is the answer having maximum possible degree of correctness for the given question in the input.

In one embodiment, a degree of correctness is a function of a number of components, from a total number of components in the set of components corresponding to an input, that is used to compute the actual category. In another embodiment, a degree of correctness is a function of a ratio of (a number of components that is used to compute the actual category) and (a number of components that is used to compute the expected category).

Similarly, if an actual answer is in an actual category that is deeper (more specific) than the expected category, the degree of correctness is one hundred percent but a degree of incorrectness also exists. The degree of incorrectness is a function of the number of extra deeper categories. This can be expressed as a precise formula: [(a number of components that is used to compute the expected category)/(a number of components that is used to compute the actual category)−1].

If some components used in computing the actual category overlap with some components used in computing the expected category, the degree of correctness is a function of [(number of overlapping components used in computing the actual category)/(number of components used in computing the expected category)]. The degree of incorrectness is a function of [(number of non-overlapping components used in computing the actual category)/(number of components used in computing the expected category)]. Consequently, when no components overlap, the degree of correctness is zero percent and the degree of incorrectness is one hundred percent, meaning all the effort expended in the traversing to the actual category is wasted, and all of the effort associated with determining the correct answer remains to be done.

The degree of correctness and the degree of incorrectness can be computed in other manners as well according to the illustrative embodiments. For example, an embodiment computes a distance between the actual category and the expected category. The distance is a measurement of a traversal of the hierarchy needed to reach from the actual category to the expected category. In this approach, necessary traversals are deemed "correct" while unnecessary traversals are deemed "incorrect" because they have to be undone by a traversal in the opposite direction.

For example, assume that node 1 has two children nodes 1.A and 1.B in a given hierarchy. Further assume that a traversal from a parent node to its child node is regarded as a normal direction of traversal, and a traversal from a child node to its parent node is regarded as an opposite direction of traversal.

In one example scenario, if the actual category for a given input is at node 1 and the expected category is at node 1.A, a single traversal in the normal direction will increase the correctness of the answer. In another example scenario, if the actual category for a given input is at node 1.B and the expected category is at node 1.A, a traversal in the opposite direction is needed to return from node 1.B to node 1 and then a traversal in the normal direction is needed from node 1 to reach node 1.A. thus, to increase the correctness of the answer, two traversals—one normal and one opposite—are needed in this scenario.

A distance between any actual category and any expected category can be computed in a similar manner. It is possible that the actual category and the expected category may lie in completely different hierarchies. In such cases, a hierarchy to hierarchy traversal may also be required, which allows traversing from the root node of one hierarchy to the root node of the other hierarchy.

A distance between the actual category and the expected category is indicative of a degree of correctness, a degree of incorrectness, or both. A degree of correctness may or may not be related to a degree of incorrectness.

For example, if the traversal from an actual category to an expected category requires only normal direction traversals in the same hierarchy, the actual answer is not incorrect, but simply not correct enough. As another example, if the traversal from an actual category to an expected category requires at least one opposite direction traversal, the actual answer has some degree of incorrectness. As another example, if a traversal from an actual category to an expected category requires some opposite direction and some normal direction traversals while remaining within a given hierarchy, the actual answer is partially correct and partially incorrect.

As another example, if a traversal from an actual category to an expected category requires a traversal from one hierarchy to another hierarchy, the actual answer is entirely incorrect—any effort spent traversing in the wrong hierarchy is wasted and has to be undone. As another example, if no traversal is required from an actual category to an expected category, i.e., the actual category and the expected category are the same, the actual answer is entirely correct and nothing needs to be undone. Similarly, if an actual answer is in an actual category from where only opposite direction traversal is needed to reach the expected category, the degree of correctness is one hundred percent but a degree of incorrectness also exists in the actual answer because of over-traversal past the expected category node. Thus, the actual answer is incorrect by a function of the opposite traversal distance and correct by 100 percent.

According to another embodiment, a link from a node to another node (e.g., between a parent node and a child node) in a hierarchy may have a weight associated with the link. The weight of a link corresponds to a computational cost of reaching one node from the other node. The weight may be same in the normal and opposite direction traversals of the link, or may be different.

When using a weighted hierarchy, an embodiment computes a degree of correctness using not only the distance and types of traversals as described herein, but also using the weights of the traversed links in the directions of the traversals. For example, again assume that node 1 has two children nodes 1.A and 1.B in a given hierarchy. The weight of link 1-1.A is 10 and the weight of link 1-1.B is 5. Suppose two questions are asked and two actual answers are produced. The correctness of an actual answer in actual category 1 when the expected category is 1.A is a function of weight 10, and the correctness of another actual answer in actual category 1 when the expected category for the second answer is 1.B is a function of weight 5. The first actual answer is less correct as compared to the second actual answer because, cost-wise, significantly more computation remains to be performed to reach from 1 to 1.A as compared to the computations remaining to reach from 1 to 1.B.

Now suppose that the weight of link 1-1.A is 10 and the weight of link 1-1.B is 5 in normal directions; and the weight of link 1-1.A is 11 and the weight of link 1-1.B is 6 in the opposite direction (cost to undo a computation to traverse in the opposite direction). Now, if an actual answer is in actual category 1.B when the expected category is 1.A, the degree of correctness is a function of weight 6 (to go from 1.B to 1) and weight 10 (to go from 1 to 1.A), i.e., a function of weight 16. Thus, the actual answer is incorrect by a function of weight 6 and correct by a function of weight 10. Similarly, if an actual answer is in actual category 1.A when the expected category is 1, the degree of correctness is one hundred percent because node 1 has already been reached in computing the actual answer but a degree of incorrectness exists because of over-traversal past node 1 to node 1.A, and a degree of incorrectness is therefore a function of weight 10 (to go from 1 to 1.A). Thus, the actual answer is incorrect by a function of weight 10 and correct by 100 percent.

Once a degree of correctness and a degree of incorrectness have been established for a given input, an embodiment causes a learning operation to occur relative to the cognitive system. For example, the learning operation includes self-evaluation and machine-learning operations to occur in the cognitive system for self-training and improvement. The learning operation enables faster non-human-aided training to occur during cognitive system training, and for continuous machine learning to occur when the cognitive system is deployed. An embodiment therefore even allows a cognitive system to be deployed without training because the expected categories improve as the system is used and trained "on the job". The learning operation can be configured to trigger when a degree of correctness falls below a threshold correctness, a degree of incorrectness rises above a threshold degree of incorrectness, or some combination thereof.

In the learning operation, one embodiment reanalyzes the input to determine whether more, less, or different components can be extracted from the input such that a new subset of re-computed components would lead to a different actual category which has a higher degree of correctness, a lower degree of incorrectness, or both, relative to the expected category. The re-analysis may parse the input differently to yield new or different components, assign revised weights or influence to the components used in the computation of the revised actual category, or some combination thereof.

For example, suppose that a word in the input was used as a component to compute actual category 1.B and a variation or synonym of the same word can lead to actual category 1.A (assuming the expected category is 1.A). In the training operation, the embodiment learns that in the context of the input (or similar inputs), the word should be regarded as the synonym to lead to a higher degree of correctness, lower degree of incorrectness, or both.

As another example, suppose a word in the input was omitted from extraction (e.g., not deduced from the input), or was present in the set of components but was omitted from the subset used in the computation, and actual category 1.B resulted. If the word can cause the answer computation to lead to revised actual category 1.A (assuming the expected category is 1.A), then the embodiment learns that in the context of the input (or similar inputs), the word should be extracted and/or to lead to a higher degree of correctness, lower degree of incorrectness, or both.

As another example, suppose word W1 in the input was used in the computation leading to actual category 1.B, and word W2 would lead to answer category 1.A (assuming the expected category is 1.A). The embodiment learns that in the context of the input (or similar inputs), the weight assigned to W1 in the computation should be reduced, the weight assigned to W2 should be increased such that the likelihood of computing actual category 1.A is increased, the likelihood of computing actual category 1.B is decreased, or both, leading to a higher degree of correctness, lower degree of incorrectness, or both. An "exclusive or" scenario might also occur where word W1 was originally weighted such that it triggers category 1.B. Then the system learns that if W1 is present in the input along with W2, then 1.A is activated and 1.B is deactivated. In other words, the presence of W2 "activates" 1.A and "inhibits" 1.B. The system may eventually learn that the presence of W1 may activate category 1 and that W3 is needed in addition to W1 to activate 1.B and further that W3 inhibits I.A.

In some cases, the learning operation can cause a change or modification of the hierarchy as well. For example, in response to one or more analyses described herein to increase the degree of correctness, lower the degree of incorrectness, or both, the cognitive system might cause a category to occur in more than one places in the hierarchy. Other changes are also possible and contemplated, such as moving a category from one parent node to another in the hierarchy, increasing or decreasing a depth of a category in the hierarchy, changing a category to a different category, dividing a category in to more than one category child nodes of the same or different parent nodes, combining more than one category nodes from one or more parent nodes into a single node, deleting a node, moving a node to a different hierarchy, creating a new node, and many other modifications possible in a tree-type hierarchy. Thus, the illustrative embodiments make it possible to build up a category hierarchy through actual use in production rather than having to wait until the system is trained to some threshold level.

The manner of training a cognitive system on partial correctness described herein is unavailable in the presently available methods. A method of an embodiment described herein, when implemented to execute on a device or data processing system, comprises substantial advancement of the functionality of that device or data processing system in improving a cognitive system's performance in an interactive interview type Q and A session, and in providing an unsupervised self-training capability within a cognitive system.

An embodiment can be adapted to operate in an unsupervised mode or in a supervised mode. In one non-limiting example of a supervised learning mode, an embodiment can be configured to output the actual categories to the user, receive a feedback from the user which identifies one or more expected categories based on that input. The measurement of the degree of correctness can then be performed in any manner described herein. In one embodiment, that feedback comes from an end user. In another embodiment, that feedback is from a person specifically designated to examine the dialogues and provide feedback. In still another embodiment, that feedback comes from a system that automatically extracts the input and expected answer from the dialogues.

In an automated unsupervised learning mode, an embodiment can be adapted to output the actual categories to a training system, receive a feedback from the training system which identifies one or more expected categories based on that input. The measurement of the degree of correctness follows thereafter as described herein.

In another non-limiting example of an unsupervised learning mode, an embodiment can be adapted to lookup an answer key and compute one or more expected categories based on that input and the corresponding answer entry in the answer key. The subsequent measurement of the degree of correctness follows thereafter as described herein. From this disclosure, those of ordinary skill in the art will be able to conceive many other supervised and unsupervised manners of providing an expected category and the same are contemplated within the scope of the illustrative embodiments.

The illustrative embodiments are described with respect to certain types of cognitive systems, inputs, outputs, input components, categories, hierarchies, distances, traversals, weights, degrees (of correctness and incorrectness), hierarchy modifications, re-analysis, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
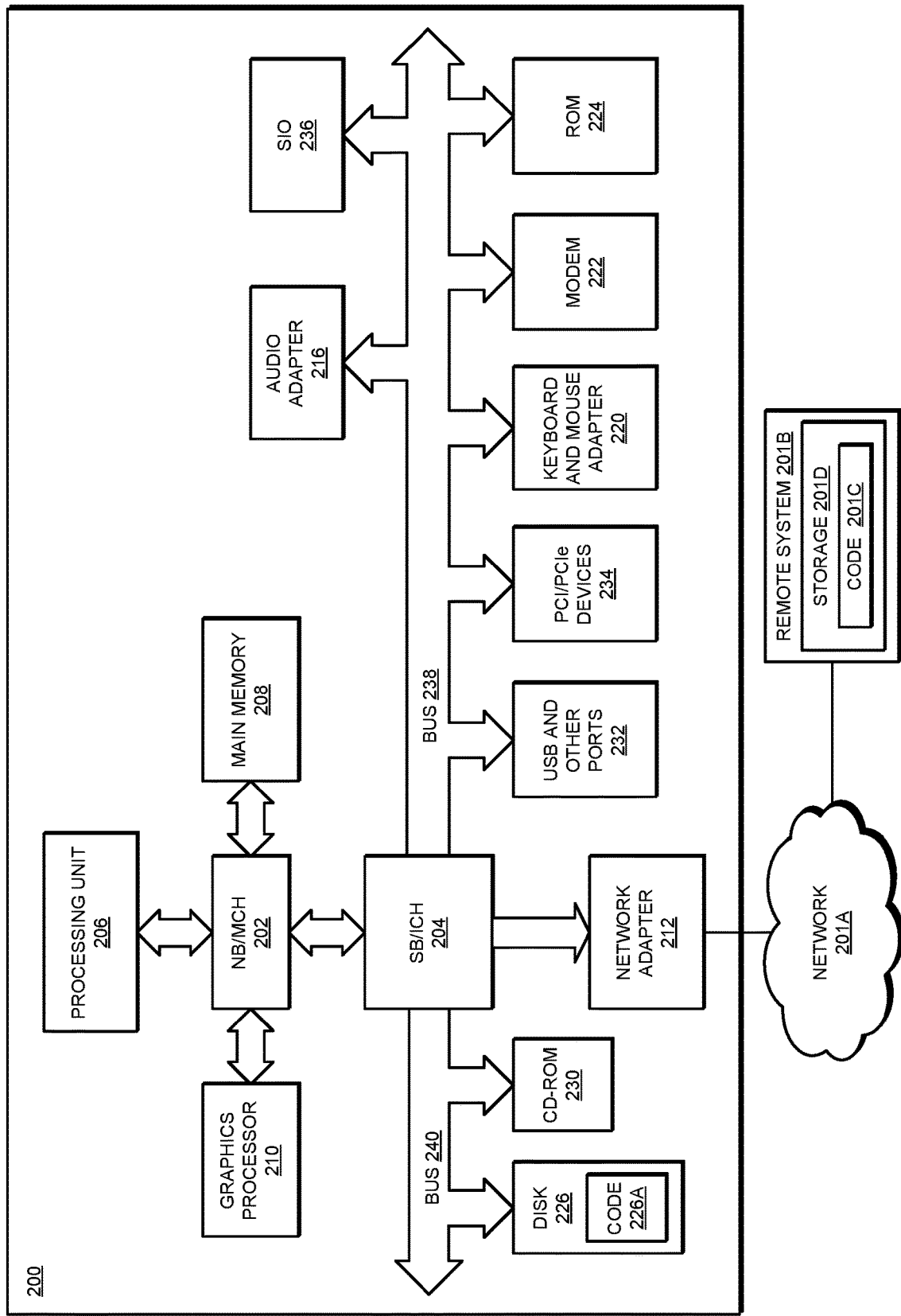
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Cognitive system 107 operates to compute answer outputs for inputs pertaining to a subject-matter domain of knowledge repository 109. Application 105 improves a training of cognitive system 107, enables cognitive system 107 to perform unsupervised self-training, enables cognitive system 107 to perform machine-learning from real inputs in post-training deployment, or some combination thereof, in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
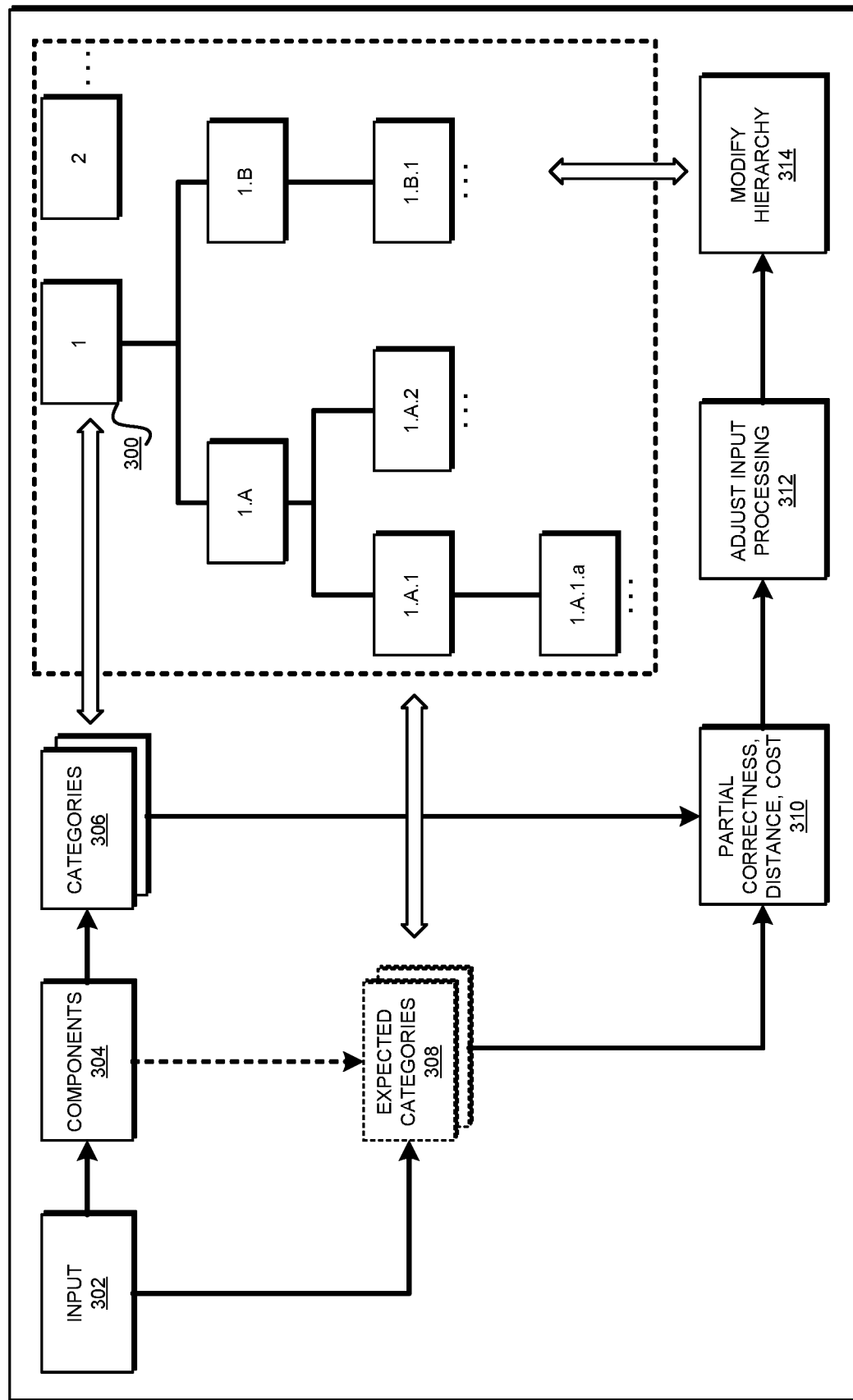
FIG. 3 depicts a block diagram of an example sequence of operations for training a cognitive system on partial correctness in accordance with an illustrative embodiment.

With reference to FIG. 3, this figure depicts a block diagram of an example sequence of operations for training a cognitive system on partial correctness in accordance with an illustrative embodiment. Application 105 when implemented in conjunction with cognitive system 107 performs, or causes cognitive system 107 to perform, one or more operations depicted and described in this figure.

Application 105 creates hierarchy 300, which is a hierarchy of categories of answer items in repository 109, as described herein. Any number of such hierarchies may be created either before the system is put into production or afterwards as part of the continuous machine learning process. For example, hierarchy 300 has example category 1 as the root node with other example categories 1.A, 1.B, 1.A.1, 1.A.2, 1.A.1.a, 1.B, 1.B.1, etc. organized as shown. Other hierarchies may begin with category 2, etc. at their respective root nodes, as shown.

Input 302 is analyzed and set of components 304 is constructed therefrom. A subset of components 304 is used to select one or more actual categories 306 from hierarchy 300. Expected categories 308 are one or more expected categories from hierarchy 300 corresponding to input 302.

The application uses an actual category from actual categories 306 and an expected category from expected categories 308 to compute partial correctness 310 of the answer produced by the cognitive system. Partial correctness 310 includes a degree of correctness, a degree of incorrectness, or both, in a manner described herein. The degree of correctness and incorrectness can be measured on any suitable scale, including but not limited to a scale of 0-100 percent.

Partial correctness 310 can be computed using only the number of components 304 used in computing actual category 306 and expected category 308, using a distance in hierarchy 300, a weighted distance (cost) in hierarchy 300, or some combination of these methods described herein.

The application uses partial correctness 310 to cause one or more operations. For example, the application may cause the cognitive system to adjust the input processing, e.g., by re-analyzing input 302 to produce a different set of components 304, select a different subset of components from components 304, assign a different significance or influence to a component 304, or some combination thereof, in the computation of a revised actual category 306.

The application may additionally or alternatively cause the cognitive system to modify hierarchy 300 in a manner described herein. Operation 312, 314, or both, comprise a learning operation of the cognitive system as improved by an embodiment. Whether operation 312 is performed, operation 314 is performed, or both operations 312 and 314 are performed depends on the implementation of the cognitive system, the subject-matter domain of input, a degree of correctness/incorrectness found during a particular execution, or some combination of these and many other factors.

Figure 4:
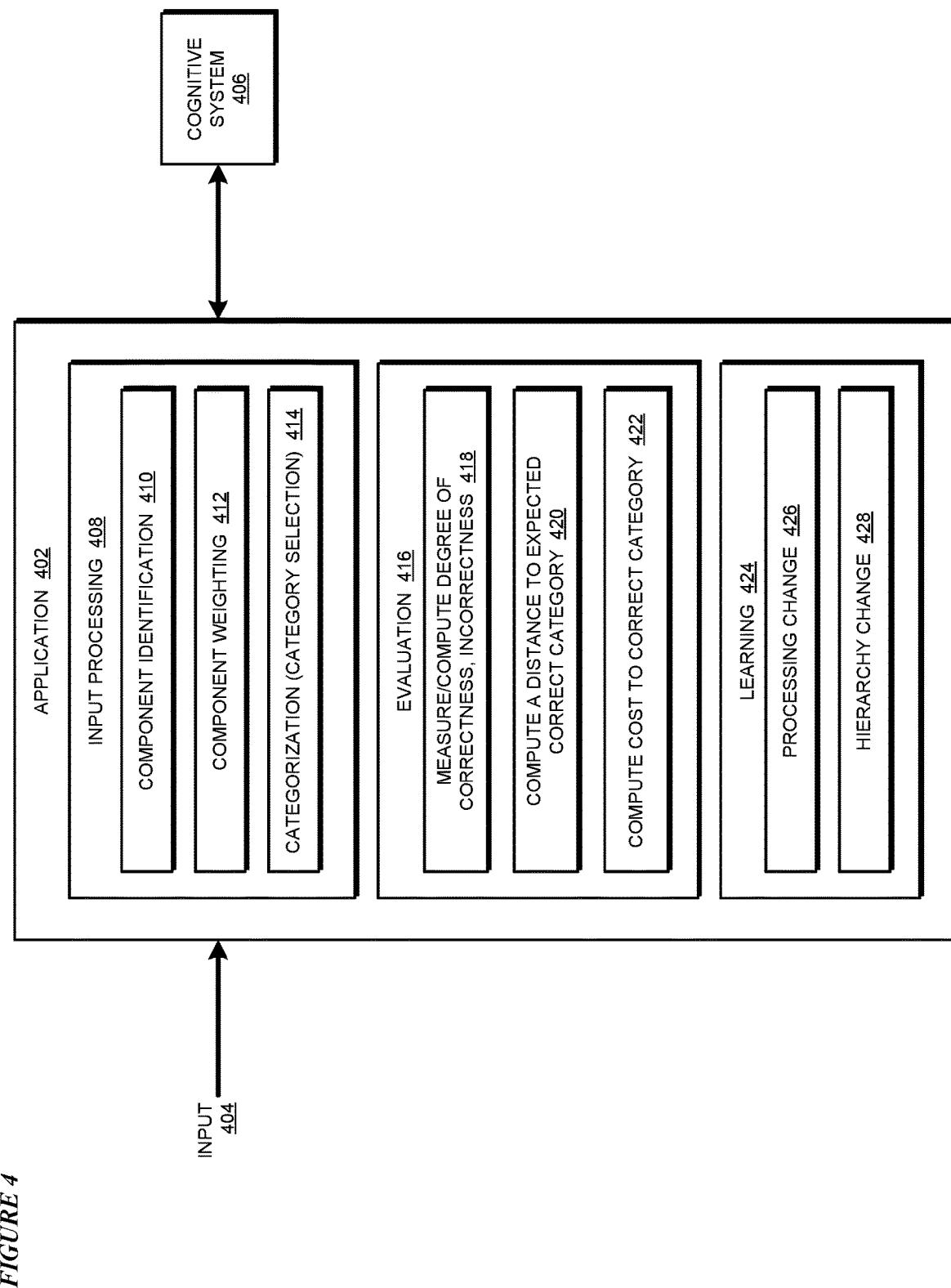
FIG. 4 depicts a block diagram of an example application for training a cognitive system on partial correctness in accordance with an illustrative embodiment.

With reference to FIG. 4, this figure depicts a block diagram of an example application for training a cognitive system on partial correctness in accordance with an illustrative embodiment. Application 402 is an example of application 105 in FIG. 1. Input 404 is an example of input 302 in FIG. 3. Cognitive system 406 is an example of cognitive system 107 in FIG. 1.

Component 408 performs input processing on input 404. For example, sub-component 410 extracts, deduces, derives, infers, or otherwise identifies a set of components, e.g., components 304 in FIG. 3, from input 404. Sub-component 412 selects a subset of the components, and computes a weight or influence value to be assigned to a component in the computation of an actual answer. Sub-component 414 computes, using a hierarchy of categories, an actual category to which an actual answer responsive to input 404 belongs.

Component 416 performs a self-evaluation of the actual answer once the expected result is available, e.g., either provided by a human user, provided by a training system, or computed from an answer key. For example, sub-component 418 measures or computes a degree of correctness and a degree of incorrectness of the actual answer using an actual category and an expected category, as described herein. When distance computation is used in a manner described herein, sub-component 420 performs the distance computation using the hierarchy of categories. When cost-based evaluation is to be performed, sub-component 422 uses the distance and weights of the links in the hierarchy to compute a cost of reaching the expected category from the actual category.

Component 424 implements the unsupervised self-learning and machine-learning aspects described herein. For example, sub-component 426 applies a change to the input processing operation of component 408 to increase the degree of correctness, decrease the degree of incorrectness, or both. Similarly, when needed, sub-component 428 applies a change to the hierarchy used in the computation of the actual answer, to increase the degree of correctness, decrease the degree of incorrectness, or both.

With reference to FIG. 5, this figure depicts an example operation for training a cognitive system on partial correctness in accordance with an illustrative embodiment. Application 402 can perform the operations that result in table 500.

Column 502 lists an overall error state of an actual answer. In other words, column 502 describes how the actual answer is to be regarded relative to an input.

Column 504 lists an expected category of a correct expected answer. Column 506 lists an actual category of an actual computed answer. Column 508 lists a description of the error state listed in column 502. Column 510 lists non-limiting example manners in which the degree of correctness and a degree of incorrectness are computed for a given error state. Column 512 lists the value of the degrees of correctness and incorrectness computed using the method of column 510.

As a non-limiting example, hierarchy 300 can be used to illustrate the operations depicted in table 500. For example, row 514 shows that the actual category is "too shallow" i.e., not deep enough in hierarchy 300, relative to the expected category in row 514. The expected category was at node 1.A.1 whereas the actual category only reached node 1.A. The description in column 508 row 514 provides that the error state is shallow because fewer components from the input were used in computing the actual category than were used in computing the expected category. In other words, the subset of components used for the expected category is a superset of the subset of components used for the actual category.

Column 510 entry in row 514 shows a non-limiting example manner of computing the degree of correctness as:

> Percentage correctness=(number of components used for the actual category)/(number of components used for the expected category)

Column 510 entry in row 514 shows a non-limiting example manner of computing the degree of incorrectness. In this case, the degree of incorrectness is zero because the actual category is in the path to the expected category, just not deep enough (only normal traversal needed).

Rows 516, 518, 520, and 522 show some more example computations for other possible error states. These examples of error states and the corresponding computations are not intended to be limiting. From this disclosure, those of ordinary skill in the art will be able to conceive many other error states and corresponding computations of the degrees of correctness and incorrectness, and the same are contemplated within the scope of the illustrative embodiments.

With reference to FIG. 6, this figure depicts a table of some example learning operations performable for training a cognitive system on partial correctness in accordance with an illustrative embodiment. Application 402 can perform the actions described in table 600.

Column 602 corresponds to column 502 in table 500. Column 604 lists some non-limiting possibilities for the learning operations described herein.

For example, in column 604 row 606, one possible learning operation is to re-analyze the question text of the input, determine whether a synonym for an expected category can be extracted or derived from the question text in the form of a component such that the subset of components used in computing the actual answer can be expanded to include the synonym (component). Expanding the subset of components with the synonym of a category name or identifier increases the likelihood of the actual answer using that category.

Rows 608, 610, 612, and 614 describe some other example learning operations. For example, according to row 608, when the correctness is of the highest possible degree, no learning action is needed. According to row 610, attempts to modify the hierarchy using an unused component, to wit, a component that was not used in the computation of the actual category. Particularly, the modification should be such that the actual category is not computed again for the revised actual answer after the modification. More specifically, the revised actual answer should be closer to the expected category after the modification. Rows 612 and 614 describe different variations of a learning operation where an influence of a component in computing the actual category is adjusted such that a different branch in the hierarchy is taken from a correct parent node of an incorrect child node.

Optionally, even in an exact match situation, as in row 608, the system can be improved by reinforcing the components, e.g., by increasing the weights of the selected components that led to the correct match between the expected and actual categories, such that a likelihood that similar inputs will map to correctly matching answer categories in other runs of the system. Additionally, where computation costs are a factor in branch or path determination, the actual cost of the correct answer can be a factor in that determination.

These examples of learning operations are not intended to be limiting. From this disclosure, those of ordinary skill in the art will be able to conceive many other learning operations applicable to other possible circumstances and the same are contemplated within the scope of the illustrative embodiments.

Figure 7:
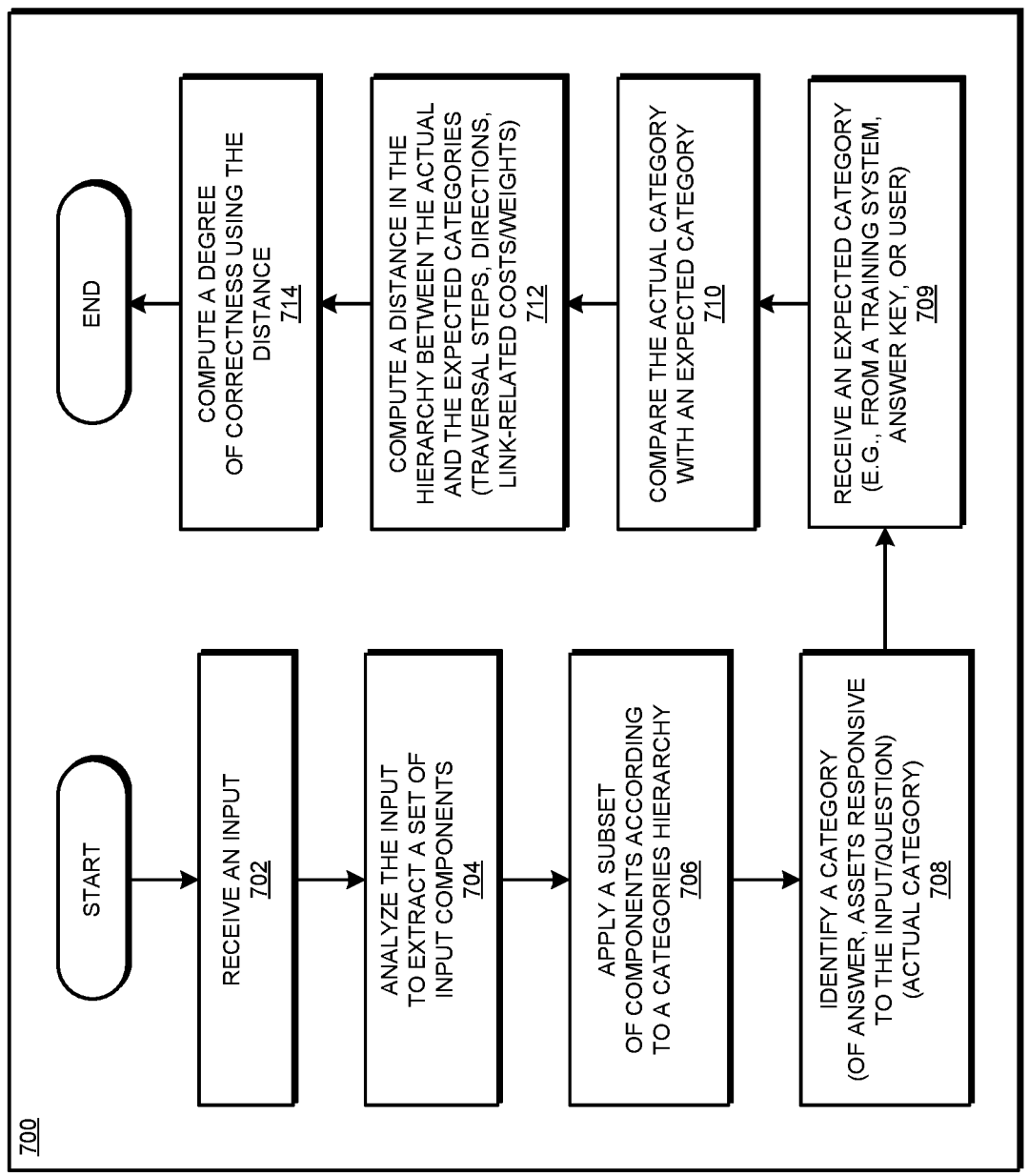
FIG. 7 depicts a flowchart of an example process for training a cognitive system on partial correctness in accordance with an illustrative embodiment.

With reference to FIG. 7, this figure depicts a flowchart of an example process for training a cognitive system on partial correctness in accordance with an illustrative embodiment. Process 700 can be implemented in application 402 in FIG. 4.

Assume that the application has already computed a hierarchy, e.g., hierarchy 300 in FIG. 3. The application receives an input (block 702). The input can be during training of the cognitive system or during post-training production deployment.

The application analyzes the input to compute a set of natural language components of the input (block 704). The application applies a subset of the components according to a hierarchy of categories of answers (block 706). For example, the application selects those components for computing an answer that correspond in some respect to the categories available in a given hierarchy.

The application identifies a category that is responsive to the question in the input (block 708). This category forms an actual category as described herein.

An expected category is computed separately based on an expected answer for the question and the hierarchy of categories in use. In one non-limiting example of a supervised learning process, process 700 can be adapted to output the actual categories to the user, receive a feedback from the user which identifies one or more expected categories based on that input. The subsequent measurement of the degree of correctness follows thereafter as described herein. In another non-limiting example of an automated learning process, process 700 can be adapted to output the actual categories to a training system, receive a feedback from the training system which identifies one or more expected categories based on that input. The subsequent measurement of the degree of correctness follows thereafter as described herein. In another non-limiting example of an unsupervised learning process, process 700 can be adapted to lookup an answer key and find one or more expected categories based on that input. The subsequent measurement of the degree of correctness follows thereafter as described herein. From this disclosure, those of ordinary skill in the art will be able to conceive many other supervised and unsupervised manners of providing an expected category and the same are contemplated within the scope of the illustrative embodiments.

In this example process 700, a distance-based computation of degree of correctness is depicted and described. Those of ordinary skill in the art will be able to adapt process 700 for other methods of computing a degree of correctness and incorrectness as described herein and such adaptations are contemplated within the scope of the illustrative embodiments.

The application compares the actual category with the expected category (block 710). In the hierarchy, the application computes a distance between the expected category and the actual category (block 712). The application computes a degree of correctness and incorrectness using the distance in a manner described herein (block 714). The application ends process 700 thereafter.

Figure 8:
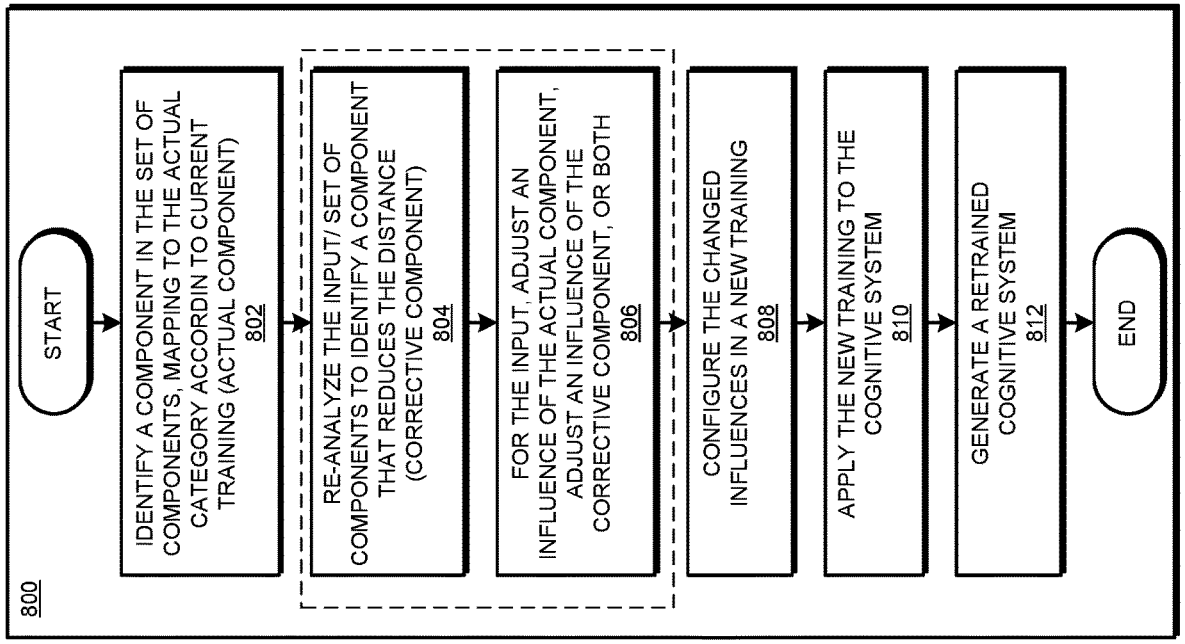
FIG. 8 depicts an example process for a learning operation in accordance with an illustrative embodiment.

With reference to FIG. 8, this figure depicts an example process for a learning operation in accordance with an illustrative embodiment. Process 800 can be implemented in application 402 in FIG. 4. Again, only one example variation of the learning process is described in process 800. Those of ordinary skill in the art will be able to adapt process 800 for other learning operations as described herein and such adaptations are contemplated within the scope of the illustrative embodiments.

The application identifies a component in the set of components that was computed from the input at block 704 in FIG. 7 (block 802). The selected component forms an old component and corresponds to an actual category that has been computed at block 708.

The application reanalyzes the input or the set of components to identify another component that reduces the distance computed in block 712 (block 804). The identified component forms a new component. For the input, the application reduces the influence, e.g., by reducing an associated weight, of the old component, increasing an influence of the new component, or both (block 806). The operations of blocks 804 and 806 are complex, and are described in greater detail with respect to FIG. 9.

The application configures the change as a new training configuration of the cognitive system such that the change is effective when the input is presented again (block 808). The application applies the new training to the cognitive system (block 810). The application generates a retrained cognitive system, which when subjected to the same input will now produce a revised actual answer that is closer in category to the expected answer as compared to the previous actual answer (block 812). The application ends process 800 thereafter.

Figure 9:
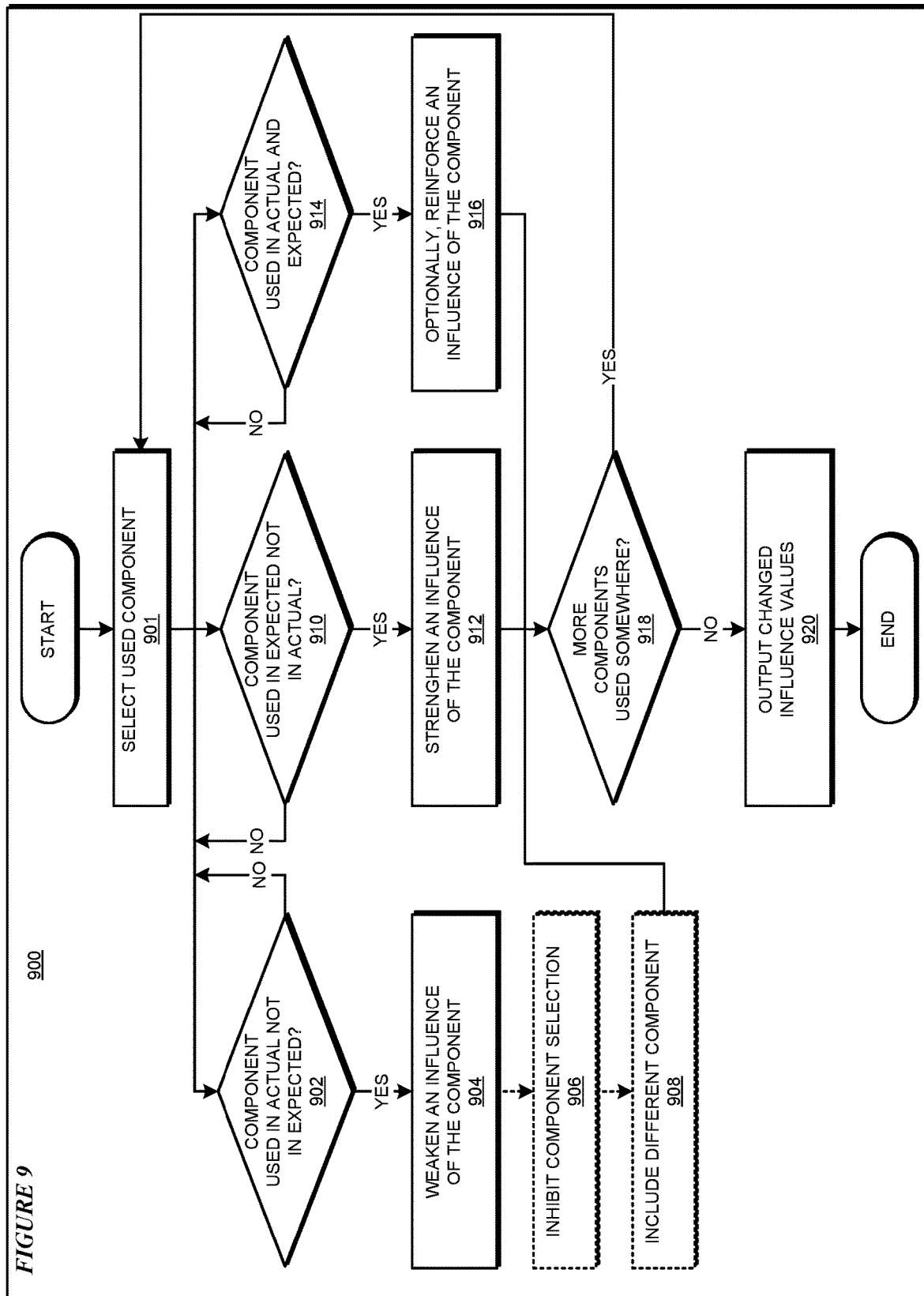
FIG. 9 depicts a flowchart of an example process of adjusting an influence of an input component in accordance with an illustrative embodiment.

With reference to FIG. 9, this figure depicts a flowchart of an example process of adjusting an influence of an input component in accordance with an illustrative embodiment. Process 900 can be implemented in blocks 804-806 of process 800 of FIG. 8.

The input received at block 702 in process 700, results in a set of components. From the set of components some components are used in computing the actual categories and some components are used in computing the expected categories. From a collection of components that were used in computing some category relative to the input received at block 702 in process 700, the application selects a component (block 901). For the selected component, the application can take one of three paths in process 900. For example, in one path, the application determines whether the component was used in computing the actual category but not used in computing the expected category (block 902). If the determination of block 902 is negative ("No" path of block 902), the application tries one of the other paths through block 910 and/or through block 914, if not already tried for the component.

If the component was used in computing the actual category but not used in computing the expected category ("Yes" path of block 902), the application weakens an influence of the component in the cognitive system (block 904). For example, the application may reduce a weight associated with that component that causes a path to be taken to the actual category in the cognitive system. Optionally, the adjustment of the influence may cause the component to be inhibited completely from selection (block 906). Optionally, the reduction of the influence at block 904 and/or the inhibiting of the component at block 906 may cause the application to explore other components in the set of components associated with the input and select a previously unselected component (block 908). For example, the application may find that an unselected component corresponds to a synonym or alternate meaning of a component that was selected for the expected category. Thereafter, the application proceeds to block 918.

In another path, the application determines whether the component was used in computing the expected category but not used in computing the actual category (block 910). If the determination of block 910 is negative ("No" path of block 910), the application tries one of the other paths through block 902 and/or through block 914, if not already tried for the component.

If the component was used in computing the expected category but not used in computing the actual category ("Yes" path of block 910), the application strengthens an influence of the component in the cognitive system (block 912). Thereafter, the application proceeds to block 918.

In another path, the application determines whether the component was used in computing the expected category and also used in computing the actual category (block 914). If the determination of block 914 is negative ("No" path of block 914), the application tries one of the other paths through block 902 and/or through block 910, if not already tried for the component.

If the component was used in computing the expected category and also in computing the actual category ("Yes" path of block 914), the application optionally reinforces an influence of the component in the cognitive system (block 916). Thereafter, the application proceeds to block 918. In one embodiment, the reinforcement of block 916 may be similar to the strengthening of block 912. In another embodiment, the reinforcement may cause an optimization of the cost of reaching the expected category using the component.

The application determines whether more components remain in the collection of components that were used in computing some category corresponding to the input (block 918). If more components remain in the collection ("Yes" path of block 918), the application returns to block 901 and selects another component. If no more components remain in the collection ("No" path of block 918), the application outputs the changed influence values (block 920). The application ends process 900 thereafter.

Thus, a system or apparatus, and computer program product are provided in the illustrative embodiments for training a cognitive system on partial correctness and other related features, functions, or operations. Where an embodiment or a portion thereof is described with respect to a type of device, the system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising one or more computer-readable storage devices, and program instructions stored on at least one of the one or more storage devices, the stored program instructions comprising:

program instructions to compute, by performing Natural Language Processing (NLP), a set of components from a question in an input;

program instructions to compute, by operating a cognitive system using a processor and a memory, an actual answer corresponding to the question, wherein the actual answer corresponds to an actual subset of the set of components, and wherein an expected answer corresponds to an expected subset of the subset of components;

program instructions to map the actual answer to an actual category in a hierarchy of answer categories;

program instructions to compute a distance between the expected answer and the actual answer, the expected answer corresponding to the question, wherein the distance is a function of a path in the hierarchy from the actual category to an expected category, and wherein a degree of correctness of the actual answer is a function of the distance;

program instructions to use, in the function of the distance for computing the degree of correctness, a direction of traversal of the path from the actual category to the expected category, wherein a first direction of traversal moving further from a root of the hierarchy operates to adjust the degree of correctness and a second direction of traversal moving closer to the root of the hierarchy operates to adjust a degree of incorrectness of the actual answer; and program instructions to cause a self-learning operation in the cognitive system to form a modified cognitive system, wherein a revised actual answer computed using the modified cognitive system on the question results in a second distance from the expected answer, the second distance being less than the distance.

2. The computer usable program product of claim 1, further comprising:

program instructions to select an unselected component from the set of components, wherein the unselected component was not selected in the actual subset, wherein a variation of the unselected component corresponds to the expected category; and program instructions to change a trained value in the cognitive system corresponding to computing the actual answer such that a revised trained value causes the variation to be selected in a revised actual subset of components relative to the question during an operation of the modified cognitive system on the input.

3. The computer usable program product of claim 2, further comprising:

program instructions to identify a selected component from the actual subset, wherein the selected component corresponds to the actual category; and program instructions to change a second trained value in the cognitive system corresponding to computing the actual answer such that a second revised trained value causes a reduced influence of the selected component in computing the revised actual answer.

4. The computer usable program product of claim 1, wherein the computer usable code is stored in a computer readable storage device in a data processing system, and wherein the computer usable code is transferred over a network from a remote data processing system.

5. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

6. The computer usable program product of claim 2, wherein the variation is a synonym of the unselected component.

7. The computer usable program product of claim 1, further comprising:

program instructions to select an unselected component from the set of components, wherein the unselected component was not selected in the actual subset; and program instructions to cause a Previously Presented category in the hierarchy to map to a variation of the unselected component such that the Previously Presented category is in a path to the expected category during an operation of the modified cognitive system on the input.

8. The computer usable program product of claim 1, further comprising:

program instructions to construct the hierarchy of answer categories, wherein a particular answer category in the hierarchy classifies a possible answer, and wherein the possible answer is computable using a subset of a set of knowledge items available in a knowledge repository used by the cognitive system.

9. The computer usable program product of claim 8, wherein the hierarchy is a member of a set of hierarchies, wherein the hierarchy is a tree-like structure of answer categories rooted in a single answer category and comprising a set of parent answer categories and a set of children answer categories, and wherein different hierarchies in the set of hierarchies are rooted in different answer categories.

10. The computer usable program product of claim 1, wherein the question input is in a natural language.

11. The computer usable program product of claim 1, wherein the actual answer comprises a workflow that is configured to answer the question.

12. The computer usable program product of claim 1, further comprising:

program instructions to calculate a first number of components in the actual subset and a second number of components in the expected subset, wherein the degree of correctness is further a function of the first number of components and the second number of components.

13. The computer usable program product of claim 1, further comprising:

program instructions to extract the expected answer from an answer key, wherein the self-training operation is an unsupervised operation.

14. The computer usable program product of claim 1, further comprising:

program instructions to receive the expected answer from a user, wherein the user is an end user of the cognitive system in a production environment, and wherein the self-training operation comprises a supervised operation.

15. The computer usable program product of claim 1, further comprising:

program instructions to receive the expected answer from a training system, wherein the self-training operation is an unsupervised operation.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to compute, by performing Natural Language Processing (NLP), a set of components from a question in an input;

program instructions to compute, by operating a cognitive system using a processor and a memory, an actual answer corresponding to the question, wherein the actual answer corresponds to an actual subset of the set of components, and wherein an expected answer corresponds to an expected subset of the subset of components;

program instructions to map the actual answer to an actual category in a hierarchy of answer categories;

program instructions to compute a distance between the expected answer and the actual answer, the expected answer corresponding to the question, wherein the distance is a function of a path in the hierarchy from the actual category to an expected category, and wherein a degree of correctness of the actual answer is a function of the distance;

program instructions to use, in the function of the distance for computing the degree of correctness, a direction of traversal of the path from the actual category to the expected category, wherein a first direction of traversal moving further from a root of the hierarchy operates to adjust the degree of correctness and a second direction of traversal moving closer to the root of the hierarchy operates to adjust a degree of incorrectness of the actual answer; and program instructions to cause a self-learning operation in the cognitive system to form a modified cognitive system, wherein a revised actual answer computed using the modified cognitive system on the question results in a second distance from the expected answer, the second distance being less than the distance.

* * * * *